US010623278B2

(12) United States Patent
Bhandari et al.

(10) Patent No.: US 10,623,278 B2
(45) Date of Patent: Apr. 14, 2020

(54) REACTIVE MECHANISM FOR IN-SITU OPERATION, ADMINISTRATION, AND MAINTENANCE TRAFFIC

(71) Applicant: Cisco Technology, Inc., San Jose, CA (US)

(72) Inventors: Shwetha Subray Bhandari, Bangalore (IN); Nagendra Kumar Nainar, Morrisville, NC (US); Carlos M. Pignataro, Cary, NC (US); Frank Brockners, Köln (DE); Reshad Rahman, Ontario, CA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 15/926,264

(22) Filed: Mar. 20, 2018

(65) Prior Publication Data
US 2019/0296988 A1 Sep. 26, 2019

(51) Int. Cl.
*H04L 12/24* (2006.01)
*H04L 12/26* (2006.01)
(Continued)

(52) U.S. Cl.
CPC ...... *H04L 41/5009* (2013.01); *H04L 43/0829* (2013.01); *H04L 45/22* (2013.01); *H04L 47/125* (2013.01); *H04L 43/12* (2013.01)

(58) Field of Classification Search
CPC . H04L 41/5009; H04L 43/0829; H04L 45/22; H04L 47/125; H04L 43/12; H04L 2012/5625
See application file for complete search history.

(56) References Cited

U.S. PATENT DOCUMENTS 6,751,221 B1 6/2004 Saito et al.
9,497,107 B1 * 11/2016 Akiya ................... H04L 45/22
(Continued)

FOREIGN PATENT DOCUMENTS

WO 99/62221 A1 12/1999

OTHER PUBLICATIONS

Katz and Ward, "Request for Comments 5880 Bidirectional Forwarding Detection (BFD)" Jun. 2010 pp. 1,2,7,9,10, 14, 17, 18, 28, 34, 38 and 46 https://tools.ietf.org/pdf/rfc5880.pdf.*
(Continued)

*Primary Examiner* — Mark H Rinehart
*Assistant Examiner* — Kenneth P Hunt
(74) *Attorney, Agent, or Firm* — Edell, Shapiro & Finnan, LLC

(57) ABSTRACT

A reactive mechanism for in-situ operation, administration, and maintenance (IOAM) traffic is provided. In one embodiment, a method is provided that includes assigning a plurality of discriminator identifiers associated with a plurality of discriminators. Each discriminator is mapped to a specified action. The method includes receiving a data packet that includes an IOAM header comprising telemetry data associated with the data packet and a bidirectional forwarding detection (BFD) field that includes a specified discriminator identifier. The method further includes determining whether the specified discriminator identifier matches one of the plurality of discriminator identifiers, and, upon determining that the specified discriminator identifier matches a first discriminator identifier of the plurality of discriminator identifiers, the method includes initiating a seamless bidirectional forwarding detection (S-BFD) reflector session to transmit a response packet according to a first action mapped to a first discriminator associated with the first discriminator identifier.

20 Claims, 7 Drawing Sheets

(51) Int. Cl.
*H04L 12/707* (2013.01)
*H04L 12/803* (2013.01)

(56) References Cited

U.S. PATENT DOCUMENTS

| | | | |
|---|---|---|---|
| 10,075,567 B1* | 9/2018 | Licking | H04L 43/08 |
| 2008/0144836 A1 | 6/2008 | Sanders et al. | |
| 2009/0037713 A1 | 2/2009 | Khalid et al. | |
| 2009/0080422 A1 | 3/2009 | Lee et al. | |
| 2010/0220615 A1 | 9/2010 | Enstrom et al. | |
| 2011/0064093 A1 | 3/2011 | Mattson et al. | |
| 2011/0280394 A1 | 11/2011 | Hoover | |
| 2012/0155283 A1* | 6/2012 | Sanguineti | H04L 41/0226 370/241.1 |
| 2012/0221854 A1 | 8/2012 | Orsini et al. | |
| 2013/0304604 A1 | 11/2013 | Hoffman et al. | |
| 2014/0198791 A1 | 7/2014 | Lim | |
| 2014/0307564 A1* | 10/2014 | Li | H04L 67/141 370/242 |
| 2014/0337638 A1 | 11/2014 | Bernaudin et al. | |
| 2014/0362682 A1 | 12/2014 | Guichard et al. | |
| 2015/0063102 A1 | 3/2015 | Mastery et al. | |
| 2015/0092564 A1 | 4/2015 | Aldrin | |
| 2015/0124626 A1* | 5/2015 | Sul | H04L 45/50 370/241.1 |
| 2015/0131484 A1 | 5/2015 | Aldrin | |
| 2015/0195197 A1 | 7/2015 | Yong et al. | |
| 2015/0227411 A1 | 8/2015 | Yi et al. | |
| 2015/0227930 A1 | 8/2015 | Quigley et al. | |
| 2015/0319490 A1 | 11/2015 | Besehanic | |
| 2016/0261474 A1* | 9/2016 | Raghavan | H04L 43/10 |
| 2016/0315850 A1 | 10/2016 | Dara et al. | |
| 2018/0176134 A1* | 6/2018 | Pignataro | H04L 47/12 |
| 2018/0331890 A1* | 11/2018 | Song | H04L 41/08 |
| 2018/0331933 A1* | 11/2018 | Song | H04L 43/10 |
| 2019/0036818 A1* | 1/2019 | Nainar | H04L 45/74 |
| 2019/0238448 A1* | 8/2019 | Pignataro | H04L 45/12 |

OTHER PUBLICATIONS

F. Brockners, et al., "Requirements for in-situ OAM", draft-brockners-inband-oam-requirements-02, Network Working Group, Internet-Draft, Expires: May 3, 2017, Oct. 2016, 23 pgs.
International Search Report and Written Opinion in counterpart International Application No. PCT/US2016/028084, dated Nov. 28, 2016, 13 pgs.
Brockners, "Verify my service chain!", Cisco blog, Architects & Distinguished Engineers Discussions, XP-002761776, Jun. 3, 2015, 4 pgs.
Brockners, "What if you had a trip-recorder for all your traffic at line rate performance?", Cisco blog, Architects & Distinguished Engineers Discussions, XP-002761777, May 19, 2015, 3 pgs.
F. Brockners, et al., "Service Chain Verification", DevNet-1084, Ciscolive!, Berlin, Germany, Feb. 15-19, 2016, XP009191657, 59 pgs.
International Search Report and Written Opinion in counterpart International Application No. PCT/US2016/028084, dated Sep. 27, 2016, 13 pgs.
Dworkin, "Recommendations for Block Cipher Modes of Operation", Methods and Techniques, NIST Special Publication 800-38A, 2001 Edition, Dec. 2001, 66 pgs.
"Samir's Secret Sharing", Wikipedia, https://en.wikipedia.org/wiki/Shamir's_Secret_Sharing, downloaded from the Internet on Oct. 1, 2015, 4 pgs.
S. Deering, et al., Request for Comments 2460, "Internet Protocol, Version 6 (IPv6)", Specification, Internet Working Group, Dec. 1998, 39 pgs.
S. Previdi, Ed. et al., "IPv6 Segment Routing Header (SRH) draft-previdi-6man-segment-routing-header-07" Internet Draft, Network Working Group, Jul. 20, 2015, 33 pgs.
F. Brockners et al., "Proof of Transit", Network Working Group, Oct. 30, 2017, 23 pages.
F. Brockners et al., "Data Fields for in-situ OAM", ippm, Jul. 2, 2017, 29 pages.

* cited by examiner

REACTIVE MECHANISM FOR IN-SITU OPERATION, ADMINISTRATION, AND MAINTENANCE TRAFFIC

TECHNICAL FIELD

The present disclosure relates to providing information in data packet headers to implement a reactive mechanism within a computer network.

BACKGROUND

In-situ Operations, Administration, and Maintenance (IOAM) data fields allow operational and telemetry information to be recorded and added into a data packet while the packet traverses a path between two points in a network. The term "in-situ" refers to the fact that the OAM data is added to the data packets rather than being sent within packets specifically dedicated to OAM.

The IOAM data fields provide an informative mechanism that can be used to collect path or performance information along a data packet's path through a network. The collected information may be gathered in a centralized database and analyzed using an analytics server, which may implement actions based on the analysis of the collected IOAM data.

DESCRIPTION OF EXAMPLE EMBODIMENTS

Overview

Figure 1:
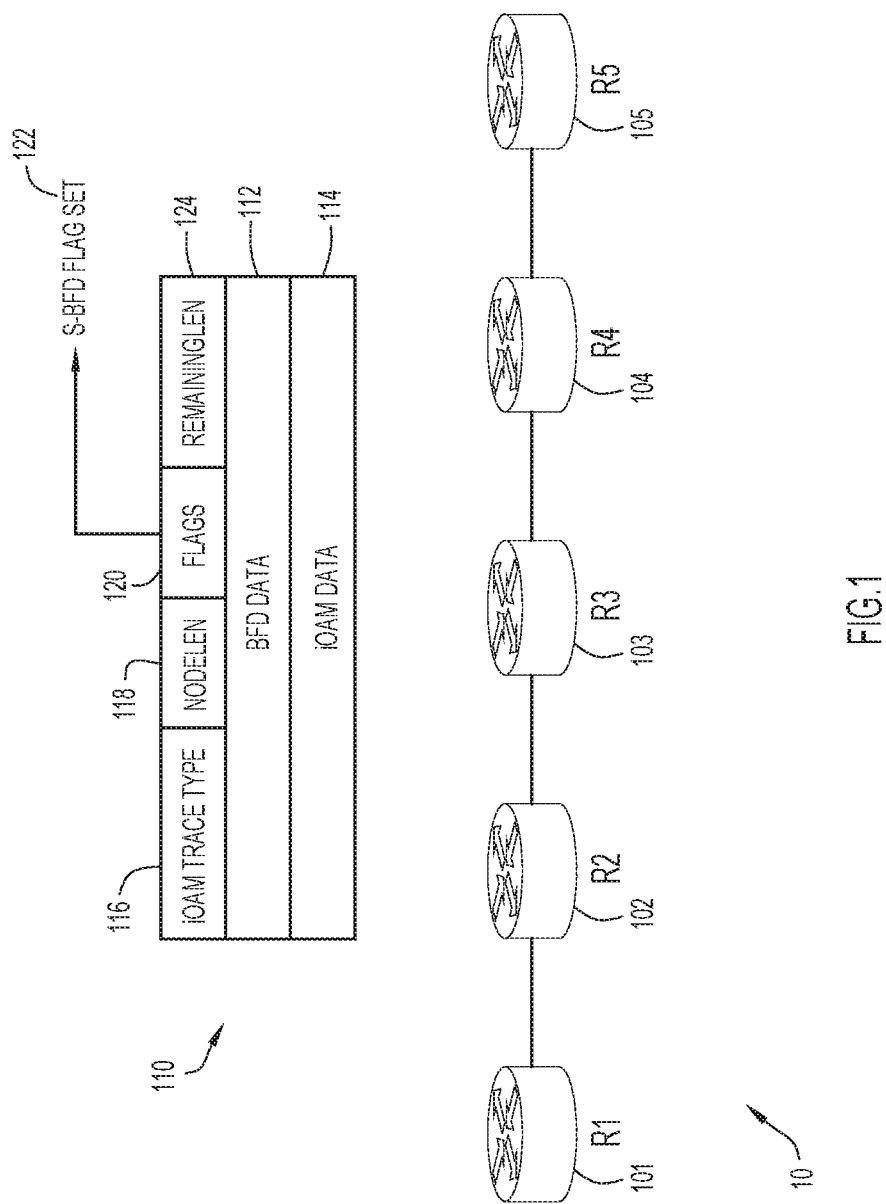
FIG. 1 is a diagram of a network in which a reactive mechanism for in-situ operations, administration, and maintenance (IOAM) traffic may be implemented, according to an example embodiment.

Presented herein are techniques for a reactive mechanism for IOAM traffic. In an example embodiment, a method is provided that includes assigning, at a first network element, a plurality of discriminator identifiers associated with a plurality of discriminators. Each discriminator of the plurality of discriminators is mapped to a specified action for the first network element. The method also includes receiving, at the first network element, a data packet sent from a second network element. The data packet includes one or more headers, including an in-situ operation, administration, and maintenance (IOAM) header comprising telemetry data associated with the data packet. The IOAM header also includes a bidirectional forwarding detection (BFD) field including a specified discriminator identifier. The method further includes determining whether the specified discriminator identifier in the BFD field of the IOAM header matches one of the plurality of discriminator identifiers assigned to the plurality of discriminators. Upon determining that the specified discriminator identifier matches a first discriminator identifier of the plurality of discriminator identifiers, the method includes initiating a seamless bidirectional forwarding detection (S-BFD) reflector session to transmit a response packet to the second network element according to a first action mapped to a first discriminator associated with the first discriminator identifier.

Example Embodiments

The current IOAM architecture is configured to collect telemetry data, such as path information, performance information, timestamps, or other relevant information, "in-band" or "in-situ" with data traffic. To accomplish this telemetry data collection, an ingress node inserts the IOAM header into a data packet and an egress node extracts the IOAM header from the data packet along with the collected telemetry data, which may be gathered in a centralized database and analyzed using an analytics server for further action. In this current architecture, the egress node does not react to the telemetry data or provide any response to the ingress node because there is no communication channel provided between the ingress node and the egress node.

Bidirectional Forwarding Detection (BFD) is an Internet Engineering Task Force (IETF) standard that allows two endpoints to monitor reachability over a link or a network by both ends periodically sending "hello" packets to each other. It is an efficient and generic hello/keepalive protocol that is widely used by many applications, including, for example, Interior Gateway Protocols (IGPs), Exterior Gateway Protocols (EGPs) and protocols such as Hot Standby Router Protocol (HSRP), Inter-Chassis Communication Protocol (ICCP), and others. Seamless Bidirectional Forwarding Detection (S-BFD) is a simplified mechanism for using BFD with a large proportion of negotiation aspects eliminated for network continuity testing.

S-BFD can be used as an "out-of-band" mechanism for rapid fault detection and reaction to a failure in the network. However, the out-of-band communication between nodes sending S-BFD probes lacks fate-sharing with the actual data traffic flowing between the nodes on the network.

According to the principles of the example embodiments described herein, a reactive mechanism for IOAM traffic is provided by including "in-band" or "in-situ" BFD data fields in IOAM headers of a data packet. The BFD data field can include S-BFD discriminator identifiers that are mapped to specific actions that may be taken by a network element upon receiving the data packet. According to the example embodiments, IOAM may be used as a transport channel for S-BFD to allow fate-sharing with data traffic and provide a reactive mechanism that permits a rapid response to failures or other events with a flow-level granularity.

Referring first to FIG. 1, a network 10 is shown in which a reactive mechanism for IOAM traffic may be implemented, according to an example embodiment. In this embodiment, network 10 may include a plurality of network elements (also referred to as "nodes"), including at least a first network element 101 (R1), a second network element 102 (R2), a third network element 103 (R3), a fourth network element 104 (R4), and a fifth network element 105 (R5). In an example embodiment, first network element 101 may be an ingress node configured to insert IOAM headers into data packets and fifth network element 105 may be an egress node configured to extract collected telemetry data from the IOAM headers of the data packets.

Network elements 101, 102, 103, 104, 105 may be any computer, server, router, switch, bridge, gateway, load-balancer, firewall, processor, network appliance, or any other suitable device, component, element, or object capable of sending, receiving, or forwarding information over a communication network, for example, network 10. In this embodiment, network 10 includes five representative network elements 101, 102, 103, 104, 105, however, it should be understood that network 10 may include any number of network elements. For example, in some embodiments, network 10 may include hundreds, thousands, tens of thousands, or more, of network elements.

As shown in FIG. 1, data packets including IOAM headers 110 may traverse network elements or nodes 101, 102, 103, 104, 105 of network 10. According to the principles of the embodiments described herein, a reactive mechanism for IOAM traffic is provided by including BFD data field 112 in IOAM headers 110 of a data packet on network 10. The BFD data field 112 can include S-BFD discriminator identifiers that are mapped to specific actions that may be taken by a network element upon receiving the data packet, as will be further described below. With this mechanism, collected telemetry data of a data packet may be provided in an IOAM data field 114 along with BFD data in BFD data field 112 in IOAM headers 110. IOAM headers 110 may include additional information, such as IOAM Trace Type field 116, Node Length (NodeLen) field 118, Flag field 120, and Remaining Length (RemainingLen) field 124. In some embodiments, an ingress node that inserts IOAM headers 110 into a data packet may also include an S-BFD Flag Set 122 in Flag field 120 to as an indicator that the IOAM headers 110 include BFD data field 112.

Figure 2:
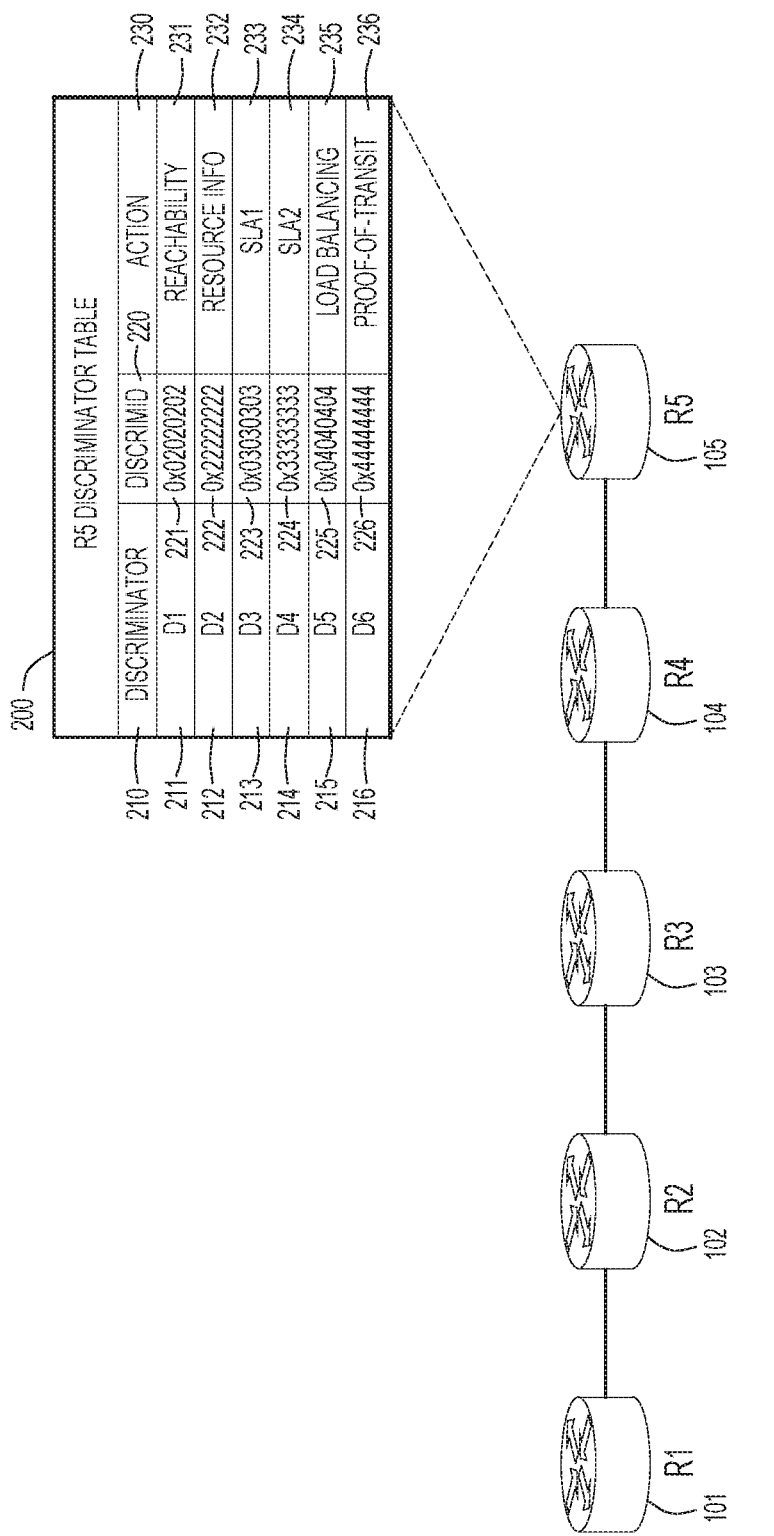
FIG. 2 is a diagram showing discriminator assignments at a network element for mapping discriminators to different reactive functions, according to an example embodiment.

Referring now to FIG. 2, assignment of discriminators at fifth network element 105 mapped to different reactive functions is shown according to an example embodiment. In this embodiment, fifth network element 105 includes stored data associated with discriminator assignments. For example, fifth network element 105 may include an assignment table 200 stored in memory at fifth network element 105. The assignment table 200 includes assignments of multiple unique discriminator identifiers 221, 222, 223, 224, 225, 226 that are associated with corresponding discriminators 211, 212, 213, 214, 215, 216, with each discriminator being mapped to an associated action or reactive function.

In an example embodiment, assignment table 200 includes a discriminator data 210, discriminator identifier (DiscrimID) data 220, and associated action data 230 that maps each unique discriminator identifier to a discriminator having a specified action for a responsive function for that discriminator. For example, discriminator data 210 includes a first discriminator (D1) 211, a second discriminator (D2) 212, a third discriminator (D3) 213, a fourth discriminator (D4) 214, a fifth discriminator (D5) 215, and a sixth discriminator (D6) 216. DiscrimID data 220 includes a first discriminator identifier 221 (0x02020202) associated with first discriminator 211, a second discriminator identifier 222 (0x22222222) associated with second discriminator 212, a third discriminator identifier 223 (0x03030303) associated with third discriminator 213, a fourth discriminator identifier 224 (0x33333333) associated with fourth discriminator 214, a fifth discriminator identifier 225 (0x04040404) associated with fifth discriminator 215, and a sixth discriminator identifier 226 (0x44444444) associated with sixth discriminator 216.

In this embodiment, action data 230 includes a first action 231 (reachability) mapped to first discriminator 211, a second action 232 (resource info) mapped to second discriminator 212, a third action 233 (SLA1) mapped to third discriminator 213, a fourth action 234 (SLA2) mapped to fourth discriminator 214, a fifth action 235 (load balancing) mapped to fifth discriminator 215, and a sixth action 236 (proof-of-transit) mapped to sixth discriminator 216. While the example embodiments include six possible actions for reactive mechanisms mapped to the six different discriminators listed in assignment table 200, it should be understood that any number of different actions for possible reactive functions can be implemented by assigning an action to a corresponding discriminator having an associated unique discriminator identifier in stored data at a network element or egress node.

According to the principles of the example embodiments described herein, first discriminator 211 is mapped to first action 231 to implement a reachability reactive function in response to a data packet containing first discriminator identifier 221 to provide information to the ingress node (e.g., first network element 101) regarding path information in network 10. Second discriminator 212 is mapped to second action 232 to implement a resource information reactive function in response to a data packet containing second discriminator identifier 222 to provide information to the ingress node (e.g., first network element 101) regarding a resource, such as a virtual application or other process running on the egress node (e.g., fifth network element 105). Third discriminator 213 is mapped to third action 233 to implement a first service level agreement (SLA) reactive function in response to a data packet containing third discriminator identifier 223 to provide information to the ingress node (e.g., first network element 101) regarding a violation of a first SLA parameter, such as a packet loss percentage exceeding a threshold. Fourth discriminator 214 is mapped to fourth action 234 to implement a second SLA reactive function in response to a data packet containing fourth discriminator identifier 224 to provide information to the ingress node (e.g., first network element 101) regarding a violation of a second SLA parameter, such as a packet delay exceeding a threshold. Fifth discriminator 215 is mapped to fifth action 235 to implement a load balancing reactive function in response to a data packet containing fifth discriminator identifier 225 to provide information to the ingress node (e.g., first network element 101) regarding capacity or load balancing on network 10. Sixth discriminator 216 is mapped to sixth action 236 to implement a proof-of-transit reactive function in response to a data packet containing sixth discriminator identifier 226 to provide information to the ingress node (e.g., first network element 101) regarding success or failure of a service function chain implemented by the egress node (e.g., fifth network element).

In the example embodiments described herein, sixth reactive functions are provided at the egress node (e.g., fifth network element 105). In various embodiments, a larger or smaller number of reactive functions may be provided. Additionally, in other embodiments, different reactive functions may be provided, as described above.

In the example embodiments described herein, IOAM data fields are described in reference to data packets sent using Segment Routing (SRv6) and/or Network Service Header (NSH) protocols. Additionally, in other embodiments, the IOAM data field can be transported by a variety of other transport protocols, including Geneve, Internet Protocol (IPv6 or IPv4), or other suitable transport protocols.

Figure 3:
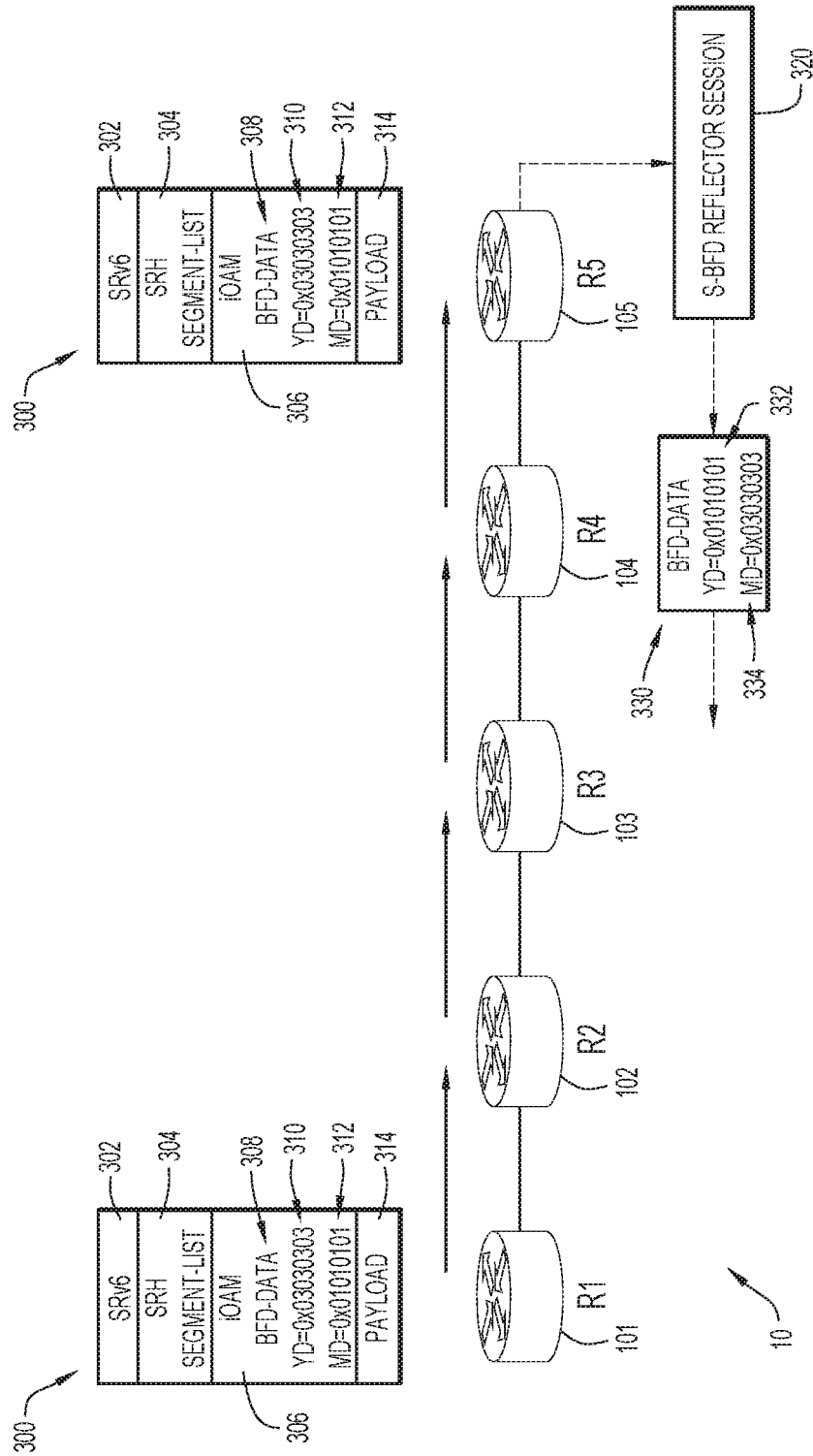
FIG. 3 is a diagram showing a network element implementing a reactive function in response to receiving IOAM traffic, according to an example embodiment.

Referring now to FIG. 3, fifth network element 105 is shown implementing a reactive function in response to receiving IOAM traffic. In this embodiment, IOAM data is added to a data packet, for example, a data packet 300, upon entering network 10 at an ingress node (e.g., first network element 101). The collected IOAM data is removed from the data packet when exiting network 10 at an egress node (e.g., fifth network element 105). Within network 10, the IOAM data may be updated by one or more of plurality of network elements 102, 103, 104 that data packet 300 traverses. The ingress node (e.g., first network element 101) adds an IOAM data container or header 306 to data packet 300 to capture IOAM data and may also be referred to as an "IOAM encapsulating node". The egress node (e.g., fifth network element 105) removes IOAM data container or header 306 from data packet 300 and may be referred to as an "IOAM decapsulating node". Network elements or nodes (e.g., plurality of network elements 102, 103, 104) within network 10 which are aware of IOAM data and read and/or write or process information to the IOAM data container or header 306 are called "IOAM transit nodes".

In addition, IOAM nodes which add or remove IOAM data container or header 306 can also update the IOAM data at the same time. In other words, IOAM encapsulating or decapsulating nodes can also serve as IOAM transit nodes. Additionally, not every network element or node in network 10 is required to be an IOAM transit node. For example, a network employing Segment Routing techniques might require the segment routing path to be verified. In such a case, only the Segment Routing nodes would also be IOAM transit nodes rather than all nodes in the network.

In this embodiment, data packet 300 uses a Segment Routing (SRv6) transit protocol to traverse through network 10. Accordingly, data packet 300 includes a transit field 302 identifying SRv6 as the transit protocol and a Segment Routing Header (SRH) 304 that includes path information, for example, a segment list identifying the path of data packet 300 through network 10. As described above, data packet 300 also includes IOAM header 306 that is configured to collect IOAM telemetry data associated with data packet 300 as it traverses between the various network elements 101, 102, 103, 104, 105 within network 10.

According to the principles of the example embodiments described herein, IOAM header 306 is configured to include a BFD field 308 that contains BFD data that may be used to implement a reactive function by the egress node (e.g., fifth network element 105). In this embodiment, the BFD data in BFD field 308 includes at least a Your Discriminator (YD) identifier 310 (set to 0x03030303) and a My Discriminator (MD) identifier 312 (set to 0x01010101).

Additionally, the BFD data in BFD field 308 may include other information, including, a diagnostic code (DIAG Code), flags, and optional type-length-value (TLV) that may be used to carry metadata. For example, the IOAM header 306 may include an indicator, such as a flag, that is associated with BFD field 308 to designate that data packet 300 includes BFD data to be processed by an egress node (e.g., fifth network element 105). In other embodiments, the presence of BFD field 308 in IOAM header 306 may designate that data packet 300 includes BFD data to be processed by the egress node.

In addition, data packet 300 may also include a payload 314. Payload 314 may include any type or kind of data that is carried by data packet 300.

According to the principles of the example embodiments, upon receiving a data packet containing a BFD field in the IOAM header, the egress node (e.g., fifth network element 105) is configured to match a YD identifier in the BFD field to stored data at the egress node (e.g., assignment table 200) and determine a specified action that is mapped to the associated discriminator for a reactive function. Once the specified action is determined, the egress node (e.g., fifth network element 105) may instantiate an S-BFD reflector session (e.g., S-BFD reflector session 320) to implement the specified action as a reactive function.

In this example, the YD identifier 310 in BFD field 308 of IOAM header 306 of data packet 300 is associated with third discriminator identifier 223 of fifth network element 105. Third discriminator identifier 223 is associated with third discriminator (D3) 213 mapped to third action 233 in assignment table 200 at fifth network element 105. Third action 233 is configured to implement a first SLA reactive function to provide information to the ingress node (e.g., first network element 101) regarding a violation of a first SLA parameter, such as a packet loss percentage exceeding a threshold.

In response to determining that YD identifier 310 in BFD field 308 of IOAM header 306 of data packet 300 matches third discriminator identifier 223, fifth network element 105 may instantiate S-BFD reflector session 320 to implement the associated reactive function for the action mapped to third discriminator (D3) 213 (e.g., third action 233). For example, using telemetry data collected in IOAM header 306 of data packet 300 that relates to the first SLA parameter, fifth network element 105 may determine that the first SLA parameter has been violated (e.g., a packet loss percentage exceeds a threshold). In this example, S-BFD reflector session 320 generates an S-BFD response packet 330 that includes the appropriate information associated with third action 233, for example, an indication of the violation of the first SLA parameter and/or the associated telemetry data associated with the first SLA parameter. In one example, S-BFD response packet 330 may include a diagnostic code (DIAG Code) that indicates a violation of the first SLA parameter.

S-BFD response packet 330 also includes fields to identify appropriate S-BFD discriminators, including a Your Discriminator (YD) identifier 332 (set to 0x01010101), i.e., the MD identifier 312 from data packet 300, and a My Discriminator (MD) identifier 334 (set to 0x03030303), i.e., third discriminator identifier 223 associated with third discriminator 213 that was included as YD identifier 310 of data packet 300. S-BFD response packet 330 traverses through network 10 back to first network element 101 (i.e., the ingress node of data packet 300).

Additionally, different discriminators may have different reflection characteristics for their associated mapped actions. For example, first discriminator (D1) 211 mapped to first action 231 may require that S-BFD reflector session 320 generates an immediate response packet to indicate that the network element or node is up and functioning. In a different case, other discriminators may only require a response from S-BFD reflector session 320 if a failure or violation is determined by the egress node. For example, third discriminator (D3) mapped to third action 233 or fourth discriminator (D4) mapped to fourth action 234 may only require that the egress node (e.g., fifth network element) instantiate S-BFD reflector session 320 upon a determination that the corresponding SLA parameter has been violated. Upon such an occurrence, S-BFD reflector session 320 may then generate a response packet with a diagnostic code (DIAG Code) indicative of the SLA parameter violation and transmit the response packet to the ingress node (e.g., first network element 101).

With this arrangement, the ingress node (e.g., first network element 101) may specify a type of response from the egress node (e.g., fifth network element 105) by including a specified discriminator identifier in the BFD field of the IOAM header of a data packet. The ingress node may insert the relevant discriminator identifier into the BFD field of the IOAM header based on different data traffic flows. The inclusion of the BFD field in the IOAM header provides a reactive mechanism for IOAM traffic.

Figure 4:
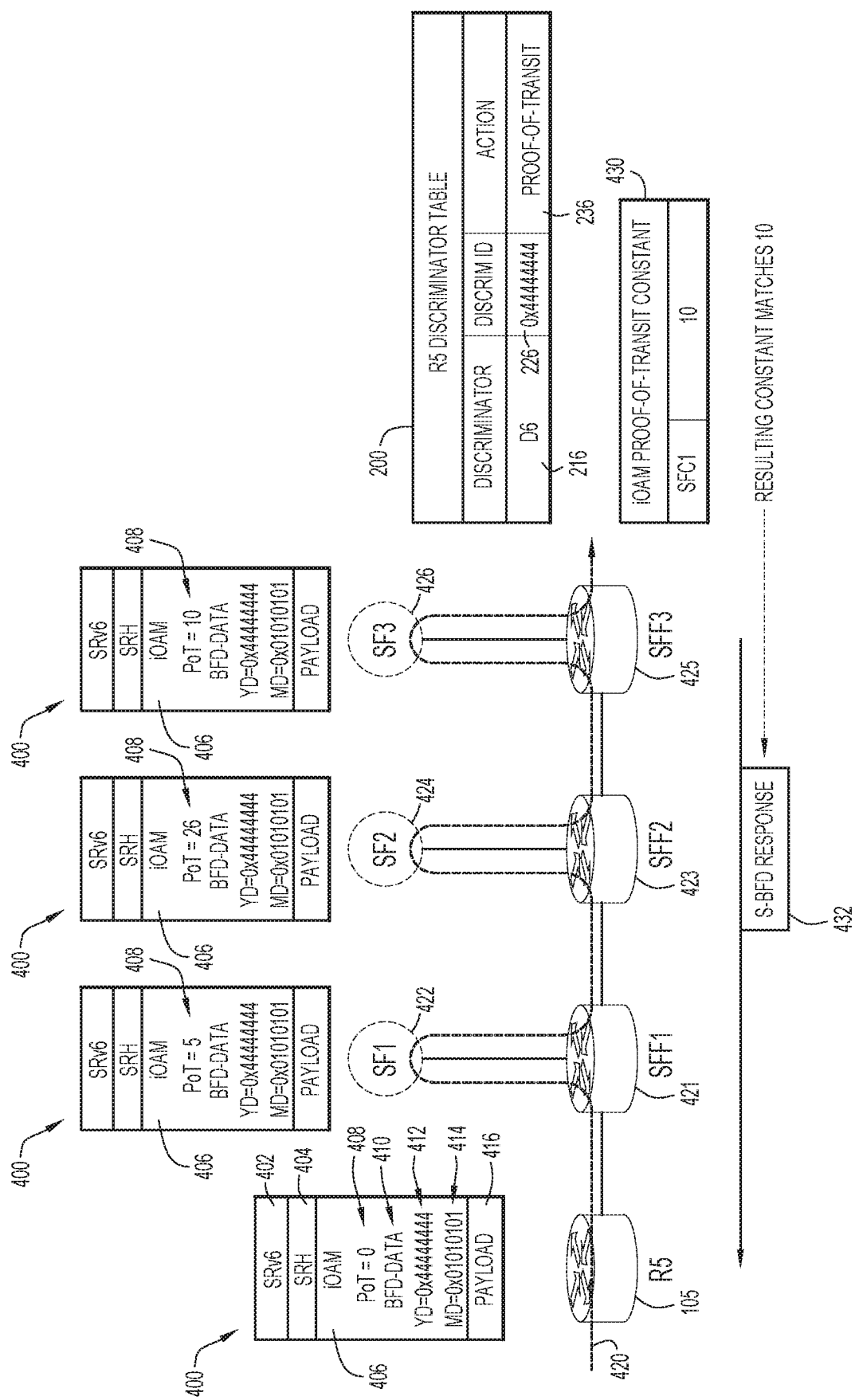
FIG. 4 is a diagram showing a proof-of-transit reactive function that may be implemented by a network element, according to an example embodiment.
Figure 5:
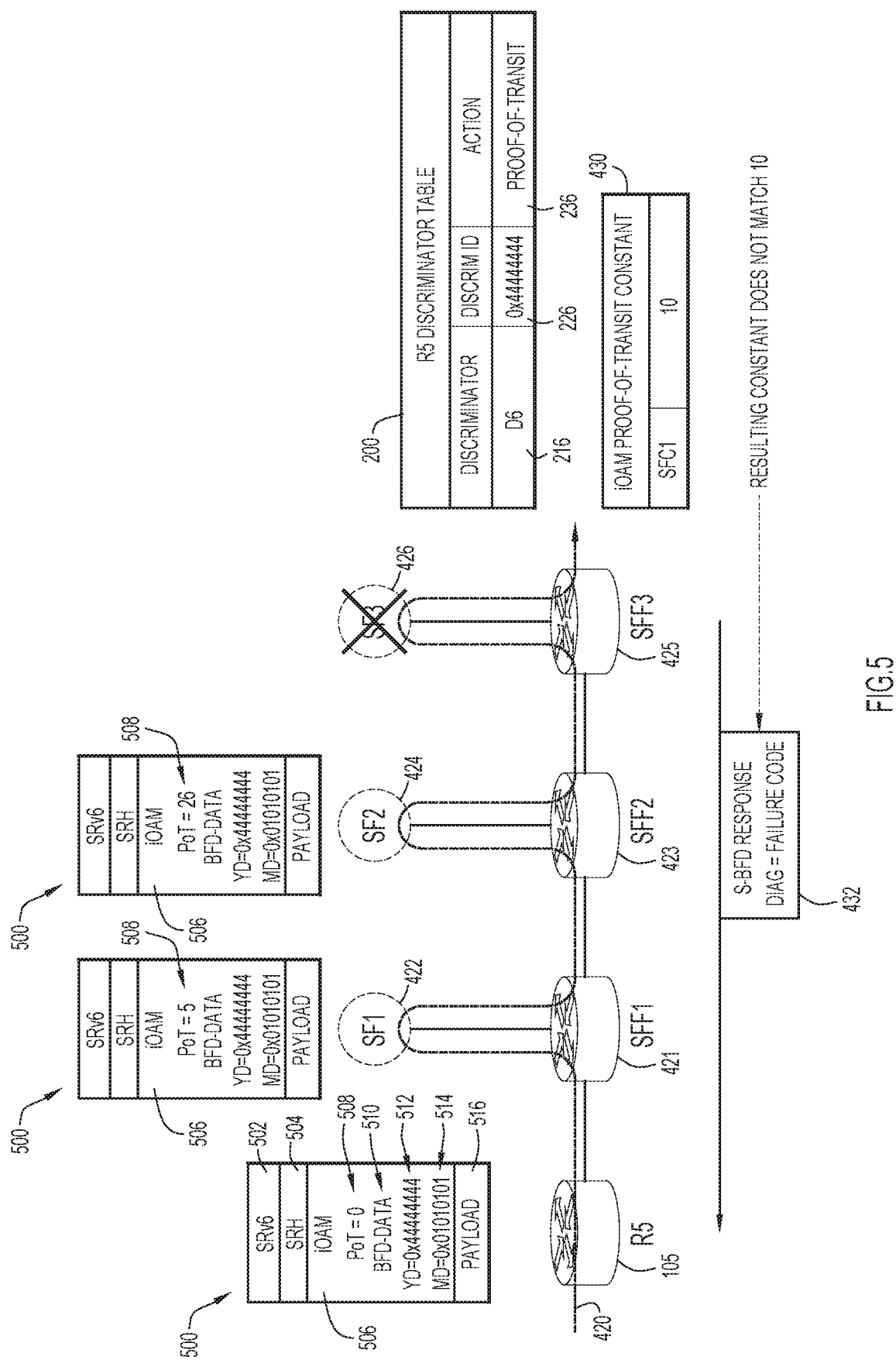
FIG. 5 is a diagram showing a proof-of-transit reactive function transmitting a failure response from a network element.

FIGS. 4 and 5 illustrate examples of a proof-of-transit reactive function for a service function chain that may be implemented by fifth network element 105 according to the principles of the embodiments described herein. Referring now to FIG. 4, in this embodiment, fifth network element 105 may receive a data packet 400 for processing via a service function chain 420. Data packet 400 is substantially similar to data packet 300, described above, and includes a transit field 402, a Segment Routing Header (SRH) 404, an IOAM header 406, and a payload 416. In this embodiment, IOAM header includes a Proof-of-Transit (PoT) field 408 (set to 1234) and a BFD field 410 that includes a YD identifier 412 (set to 0x44444444) and a MY identifier 414 (set to 0x01010101). As will be described in further detail below, PoT field 408 may be used to verify the success or failure of a service function chain that is to be performed on data packet 400 at fifth network element 105.

A service function chain defines an ordered set of service functions and ordering constraints to be applied to packets and/or frames and/or traffic flows selected as a result of classification by a network element that functions as a classifier. In this embodiment, fifth network element 105 (FIG. 1) may be a classifier for implementing service function chain 420 performed on data packet 400. Service function chain 420 may include multiple service functions, including a first service function (SF1) 422, a second service function (SF2) 424, and a third service function (SF3) 426. Each of the service functions may be performed by a corresponding service function element, including a first service function element (SFF1) 421, a second service function element (SFF2) 423, and a third service function element (SFF3) 425. In an example embodiment, service function elements 421, 423, 425 may be instances of a virtual service function executed on fifth network element 105.

As shown in FIG. 4, the YD identifier 412 in BFD field 410 of IOAM header 406 of data packet 400 is associated with sixth discriminator identifier 226 of fifth network element 105. Sixth discriminator identifier 226 is associated with sixth discriminator (D6) 216 mapped to sixth action 236 in assignment table 200 at fifth network element 105. Sixth action 236 is configured to implement the Proof-of-Transit (PoT) reactive function to provide information regarding the success of failure of a service function chain (e.g., service function chain 420) to be performed on data packet 400.

During implementation of service function chain 420 at fifth network element 105, each service function element 421, 423, 425 may perform a Proof-of-Transit calculation according to the Proof-of-Transit standards defined by Internet Engineering Task Force (IETF) draft: tools.ietforg/html/draft-brockners-proof-of-transit-04, which publication is hereby incorporated by reference in its entirety. Accordingly, when data packet 400 traverses each service function element 421, 423, 425, the node performs the a calculation of a cumulative value (CML) and updates PoT field 408 in IOAM header of data packet 400 with a new value upon completion of the service function 422, 424, 426 performed by that service function element. For example, upon the initiation of service function chain 420 at fifth network element 105, data packet 400 has CML in PoT field 408 initialized to an initial value (set to 0). Next, first service function element 421 performs first service function 422 and updates PoT field 408 in IOAM header of data packet 400 to a new value (set to 5). Similarly, second service function element 423 performs second service function 424 and updates PoT field 408 in IOAM header of data packet 400 to a new value (set to 26), and third service function element 425 performs third service function 426 and updates PoT field 408 in IOAM header of data packet 400 (set to 10).

Upon completion of service function chain 420, the last service function forwarder or Proof-of-Transit verifier (e.g., third service function element (SFF3) 425) may send a response packet to provide the outcome (success or failure) of service function chain 420. In this example, third service function element (SFF3) 425 checks a value for a Proof-of-Transit constant using information from PoT field 408 in IOAM header 406 of data packet 400 and compares the value to an expected value, for example, a Proof-of-Transit Constant 430 (expected to be 10 in this example), to determine whether service function chain 420 was successful or failed. In one embodiment, the Proof-of-Transit value may be checked or derived by third service function element (SFF3) 425 using the verification techniques according to the Proof-of-Transit standards, incorporated by reference above.

In the example shown in FIG. 4, service function chain 420 on data packet 400 was successfully completed and, therefore, the outcome of the verification by third service function element (SFF3) 425 is that the resulting derived Proof-of-Transit constant value matches the expected value (i.e., Proof-of-Transit Constant 430, which is expected to be 10 in this example). Upon which determination, third service function element (SFF3) 425 generates an S-BFD response packet 432 and transmits the response.

Referring now to FIG. 5, a scenario where service function chain 420 is not successful is illustrated. In this embodiment, fifth network element 105 receives a data packet 500 for processing via service function chain 420. Data packet 500 is substantially similar to data packet 400, described above, and includes a transit field 502, a Segment Routing Header (SRH) 504, an IOAM header 506, and a payload 516. In this embodiment, IOAM header includes a Proof-of-Transit (PoT) field 508 (set to an initial value of 0) and a BFD field 510 that includes a YD identifier 512 (set to 0x44444444) and a MY identifier 514 (set to 0x01010101).

As described above, service function chain 420 includes first service function (SF1) 422 to be performed by first service function element (SFF1) 421, second service function (SF2) 424 to be performed by second service function element (SFF2) 423, and third service function (SF3) 426 to be performed by third service function element (SFF3) 425. In this embodiment, the YD identifier 512 in BFD field 510 of IOAM header 506 of data packet 500 is also associated with sixth discriminator identifier 226 of sixth discriminator (D6) 216 of fifth network element 105, which is mapped to sixth action 236 in assignment table 200 to implement the PoT reactive function, as described above.

During execution of service function chain 420 at fifth network element 105, each service function element 421, 423, 425 updates PoT field 508 in IOAM header of data packet 500 with a new value upon completion of the service function 422, 424, 426 performed by that service function element. For example, in this embodiment, first service function element 421 performs first service function 422 and updates PoT field 508 in IOAM header of data packet 500 to a new value (set to 5) and second service function element 423 performs second service function 424 and also updates PoT field 508 in IOAM header of data packet 500 to a new value (set to 26). In this example, however, third service function element 425 fails to perform third service function 426. As a result, PoT field 508 in IOAM header 506 of data packet 500 is not updated from the previous value (remains set to 26).

In this example, when third service function element (SFF3) 425 checks the Proof-of-Transit constant using information from PoT field 508 in IOAM header 506 of data packet 500 to determine whether service function chain 420 was successful or failed for data packet 500, the result is different than the example described in reference to FIG. 4. In other words, in the example of FIG. 5, service function chain 420 has failed. In this embodiment, because third service function element 425 fails to perform third service function 426 and update the value of PoT field 508 in IOAM header 506 of data packet 500, the result of the verification is that the resulting derived Proof-of-Transit constant value does not match the expected value (i.e., Proof-of-Transit Constant 430, which is expected to be 10). Upon which determination, third service function element (SFF3) 425 generates an S-BFD response packet 520 that includes an indication that service function chain 420 has failed (e.g., DIAG=Failure code) and transmits the response. The indication of the failure of service chain 420 in S-BFD response packet 520 may be used to take further action, for example, by triggering service function path protection or sending traffic over a different service function path.

Figure 6:
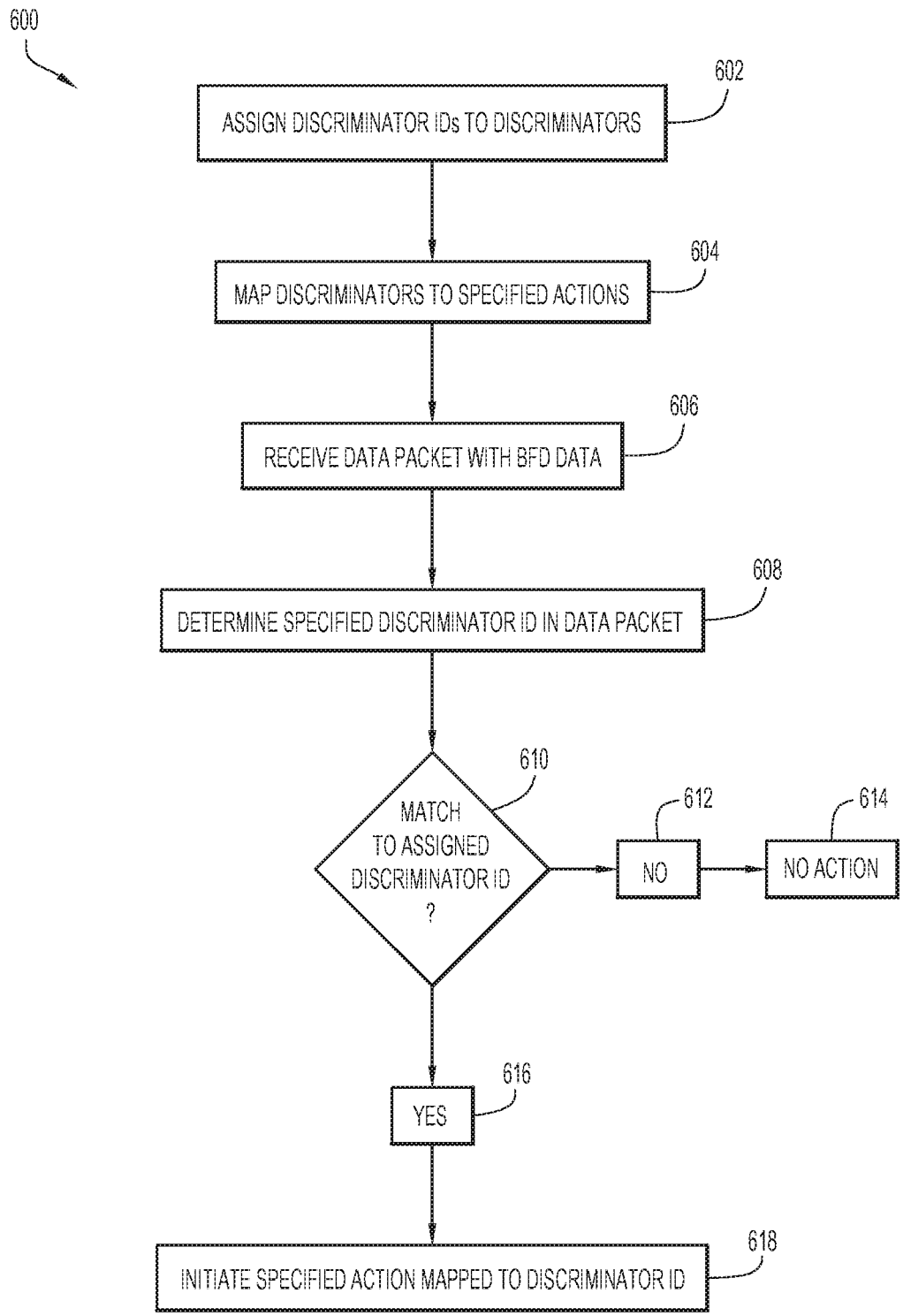
FIG. 6 is a flowchart of a method for a reactive mechanism for IOAM traffic, according to an example embodiment.

FIG. 6 illustrates a flowchart of a method 600 for a reactive mechanism for IOAM traffic at an egress node, according to an example embodiment. Reference is also made to FIGS. 1-5 for purposes of the description of FIG. 6. In this embodiment, method 600 may begin at an operation 602, where one or more different unique discriminator identifiers (IDs) are assigned to discriminators at the egress node. For example, fifth network element 105 may assign discriminator identifiers 221, 222, 223, 224, 225, 226 to discriminators 211, 212, 213, 214, 215, 216, as described above. Next, at an operation 604, each discriminator is mapped to an associated specified action for that discriminator to provide a reactive function. For example, fifth network element 105 maps actions 231, 232, 233, 234, 235, 236 to discriminators 211, 212, 213, 214, 215, 216, as described above. The discriminator IDs, associated discriminators, and mapped actions may be included in stored data at the egress node. For example, fifth network element 105 includes assignment table 200 that includes discriminator identifiers 221, 222, 223, 224, 225, 226 assigned to discriminators 211, 212, 213, 214, 215, 216 and mapped to actions 231, 232, 233, 234, 235, 236.

Additionally, according to the principles of the example embodiments described herein, each discriminator is mapped to a different reactive function. With this arrangement, a reactive mechanism for IOAM traffic may be implemented at an egress node on the basis of a discriminator identifier included in an IOAM header of a received data packet.

At an operation 606, a data packet having a BFD field in an IOAM header is sent by an ingress node and is received at the egress node. For example, data packet 300 including BFD field 308 in IOAM header 306 sent by first network element 101 and received at fifth network element 105, as described with reference to FIG. 3 above. Next, at an operation 608, the egress node determines the specified discriminator ID included in the BFD field of the IOAM header of the received data packet. For example, the YD identifier 310 from BFD field 308 in IOAM header 306 of data packet 300. Next, at an operation 610, the specified discriminator ID may be compared with stored data at fifth network element 105 associated with discriminator assignments, such as the entries in DiscrimID column 220 of assignment table 200.

If, at operation 610, the data packet does not include a specified discriminator ID that matches a discriminator ID in stored data at the egress node, then method 600 may proceed to an operation 612. In this case, since there is no matching discriminator ID in the received data packet, at operation 614 no action is taken and method 600 may end.

If, at operation 610, the data packet does include a matching specified discriminator ID, then method 600 may proceed to an operation 616. Next, method 600 may proceed to an operation 618 where the specified action that is mapped to the discriminator assigned to the discriminator ID that matches the specified discriminator ID in the data packet may be initiated. For example, as shown in FIG. 3 above, when the YD identifier 310 (set to 0x03030303) in BFD field 308 of IOMA header 306 of data packet 300 matches third discriminator identifier 223 associated with third discriminator (D3) 213 mapped to third action 233, S-BFD reflector session 320 may initiated by fifth network element 105 to transmit response packet 330 as a reactive function to provide information regarding a first SLA parameter.

Additionally, method 600 may continue by returning to operation 606 and proceeding to compare the YD identifiers in BFD fields of IOAM headers from received data packets to one of the various different discriminator IDs assigned to the discriminators at the egress node for each data packet received. For example, in some embodiments, a network element may receive a plurality of data packets that include BFD fields in IOAM headers. As a result, once discriminator IDs are assigned and discriminators are mapped to specified actions at operations 602 and 604, method 600 for a reactive mechanism for IOAM traffic may be implemented by determining whether a specified discriminator ID included in a BFD field of IOAM headers of a data packet matches an assigned discriminator, and implementing the mapped action as a reactive function.

Figure 7:
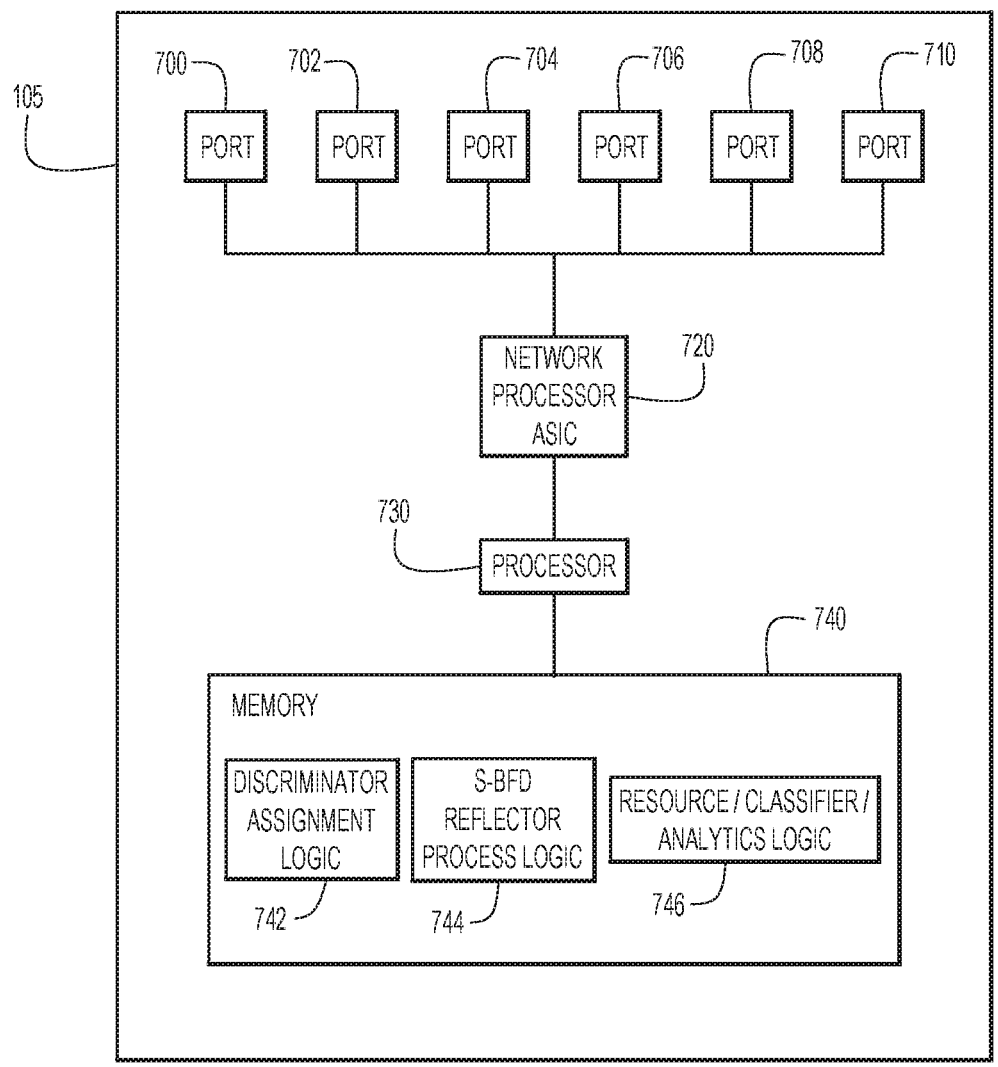
FIG. 7 is a block diagram of a network element configured to implement a reactive mechanism for IOAM traffic, according to an example embodiment.

Referring now to FIG. 7, a block diagram is shown of a network element/egress node that is configured to implement a reactive mechanism for IOAM traffic, for example, fifth network element 105. In this embodiment, fifth network element 105 may include a plurality of network ports 700, 702, 704, 706, 708, 710, a Network Processor Application Integrated Circuit (ASIC) 720, a processor 730 for processing information and may further include a bus (not shown) or other communication mechanism coupled with processor 730 for communicating the information. The Network Processor ASIC 720 performs any of a variety of networking functions (routing, switching, network address translation, etc.). Network Processor ASIC 720 may also be referred to herein as a network processor unit that performs one or more networking functions for packets received at the network ports 700, 702, 704, 706, 708, 710 and to be sent from the ports. Network Processor ASIC 720, may, for example, include one or more linecards configured to enable network communications and permit the plurality of network ports 700, 702, 704, 706, 708, 710 to receive inbound packets and to send outbound packets. While the figure shows a single block 730 for a processor, it should be understood that the processor 730 may represent a plurality of processing cores, each of which can perform separate processing.

Fifth network element 105 may also include a memory 740. The memory 740 may be read only memory (ROM), random access memory (RAM), magnetic disk storage media devices, optical storage media devices, flash memory devices, electrical, optical, or other physical/tangible memory storage devices. Thus, in general, the memory 740 may comprise one or more tangible (non-transitory) computer readable storage media (e.g., a memory device) encoded with software comprising computer executable instructions and when the software is executed (by the processor 730) it is operable to perform the operations described herein. For example, one or more of discriminator assignment control logic 742, S-BFD reflector session control logic 744, and Resource/Classifier/Analytics control logic 746 is stored in memory 740 for providing one or more of the functions of fifth network element 105 described herein. In particular, discriminator assignment control logic 742 may cause fifth network element 105 to perform the discriminator assignment and associated action operations described above in connection with FIGS. 2-6 above when executed by processor 730 from memory 740. Similarly, S-BFD reflector session control logic 744 may cause fifth network element 105 to perform the S-BFD reflection session operations described above in connection with FIG. 3 and/or operation 618 of method 600 shown in FIG. 6 above when executed by processor 730 from memory 740. Additionally, Resource/Classifier/Analytics control logic 746 may cause fifth network element 105 to perform various analytics operations, such as determining SLA parameter violations, service chain operations, including load balancing functions and proof-of-transit functions, as described above in the previous embodiments, as well as other known operations.

In addition, memory 740 may be used for storing temporary variables or other intermediate information during the execution of instructions by processor 730. Additionally, in some embodiments, one or more functions of fifth network element 105, discriminator assignment control logic 742, S-BFD reflector session control logic 744, and Resource/Classifier/Analytics control logic 746 may be performed by Network Processor ASIC 720.

The principles of the embodiments described herein allow BFD data to travel in-band with data packets to provide a rapid reaction to an event at an egress node.

According to the example embodiments, BFD data fate-shares with data traffic to allow an operator to perform various in-band activities (SLA parameter performance measurements, reachability, proof-of-transit, load-balancing, etc.) on a per-flow basis.

In summary, a method is provided comprising: assigning, at a first network element, a plurality of discriminator identifiers associated with a plurality of discriminators, wherein each discriminator of the plurality of discriminators is mapped to a specified action for the first network element; receiving, at the first network element, a data packet sent from a second network element, the data packet including one or more headers, wherein the one or more headers include an in-situ operation, administration, and maintenance (IOAM) header comprising telemetry data associated with the data packet and a bidirectional forwarding detection (BFD) field including a specified discriminator identifier; determining whether the specified discriminator identifier in the BFD field of the IOAM header matches one of the plurality of discriminator identifiers assigned to the plurality of discriminators; and upon determining that the specified discriminator identifier matches a first discriminator identifier of the plurality of discriminator identifiers, initiating a seamless bidirectional forwarding detection (S-BFD) reflector session to transmit a response packet to the second network element according to a first action mapped to a first discriminator associated with the first discriminator identifier.

In another form, one or more non-transitory computer readable storage media encoded with instructions that, when executed by a processor of a first network element, cause the processor to: assign, at the first network element, a plurality of discriminator identifiers associated with a plurality of discriminators, wherein each discriminator of the plurality of discriminators is mapped to a specified action for the first network element; receive, at the first network element, a data packet sent from a second network element, the data packet including one or more headers, wherein the one or more headers include an in-situ operation, administration, and maintenance (IOAM) header comprising telemetry data associated with the data packet and a bidirectional forwarding detection (BFD) field including a specified discriminator identifier; determine whether the specified discriminator identifier in the BFD field of the IOAM header matches one of the plurality of discriminator identifiers assigned to the plurality of discriminators; and upon determining that the specified discriminator identifier matches a first discriminator identifier of the plurality of discriminator identifiers, initiate a seamless bidirectional forwarding detection (S-BFD) reflector session to transmit a response packet to the second network element according to a first action mapped to a first discriminator associated with the first discriminator identifier.

In addition, an apparatus is provided comprising: a plurality of network ports configured to receive inbound packets and to send outbound packets; a memory; a processor coupled to the memory and to the plurality of network ports, wherein the processor is configured to: assign a plurality of discriminator identifiers associated with a plurality of discriminators, wherein each discriminator of the plurality of discriminators is mapped to a specified action for a first network element; receive a data packet sent from a second network element, the data packet including one or more headers, wherein the one or more headers include an in-situ operation, administration, and maintenance (IOAM) header comprising telemetry data associated with the data packet and a bidirectional forwarding detection (BFD) field including a specified discriminator identifier; determine whether the specified discriminator identifier in the BFD field of the IOAM header matches one of the plurality of discriminator identifiers assigned to the plurality of discriminators; and upon determining that the specified discriminator identifier matches a first discriminator identifier of the plurality of discriminator identifiers, initiate a seamless bidirectional forwarding detection (S-BFD) reflector session to transmit a response packet to the second network element according to a first action mapped to a first discriminator associated with the first discriminator identifier.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
assigning, at a first network element, a plurality of your discriminator identifiers associated with a plurality of your discriminators, wherein each your discriminator of the plurality of your discriminators is mapped to a specified action for the first network element;
receiving, at the first network element, a data packet sent from a second network element, the data packet including one or more headers, wherein the one or more headers include an in-situ operation, administration, and maintenance (IOAM) header comprising telemetry data associated with the data packet and a bidirectional forwarding detection (BFD) field including a specified your discriminator identifier;
determining whether the specified your discriminator identifier in the BFD field of the IOAM header matches one of the plurality of your discriminator identifiers assigned to the plurality of your discriminators; and
upon determining that the specified your discriminator identifier matches a first your discriminator identifier of the plurality of your discriminator identifiers, initiating a seamless bidirectional forwarding detection (S-BFD) reflector session to transmit a response packet to the second network element according to a first action mapped to a first your discriminator associated with the first your discriminator identifier.

2. The method of claim 1, wherein the first action comprises providing information regarding reachability of the first network element to the second network element.

3. The method of claim 1, wherein the first action comprises providing information regarding at least one resource associated with the first network element.

4. The method of claim 1, wherein the first action comprises providing information regarding service level agreement (SLA) parameters.

5. The method of claim 4, wherein the SLA parameters include at least one of packet loss information and packet delay information.

6. The method of claim 1, wherein the first action comprises providing information associated with load balancing obtained from the telemetry data in the IOAM header in the response packet transmitted to the second network element.

7. The method of claim 1, wherein the response packet transmitted to the second network element includes information based on the telemetry data from the IOAM header of the data packet received by the first network element.

8. The method of claim 1, wherein the IOAM header further includes an indicator associated with the BFD field to designate that the data packet includes BFD data to be processed by the first network element.

9. The method of claim 1, wherein the telemetry data in the IOAM header is obtained from a plurality of network elements disposed between the first network element and the second network element.

10. One or more non-transitory computer readable storage media encoded with instructions that, when executed by a processor of a first network element, cause the processor to:
assign, at the first network element, a plurality of your discriminator identifiers associated with a plurality of your discriminators, wherein each your discriminator of the plurality of your discriminators is mapped to a specified action for the first network element;
receive, at the first network element, a data packet sent from a second network element, the data packet including one or more headers, wherein the one or more headers include an in-situ operation, administration, and maintenance (IOAM) header comprising telemetry data associated with the data packet and a bidirectional forwarding detection (BFD) field including a specified your discriminator identifier;
determine whether the specified your discriminator identifier in the BFD field of the IOAM header matches one of the plurality of your discriminator identifiers assigned to the plurality of your discriminators; and
upon determining that the specified your discriminator identifier matches a first your discriminator identifier of the plurality of your discriminator identifiers, initiate a seamless bidirectional forwarding detection (S-BFD) reflector session to transmit a response packet to the second network element according to a first action mapped to a first your discriminator associated with the first your discriminator identifier.

11. The one or more non-transitory computer readable storage media of claim 10, wherein the first action comprises providing information to the second network element regarding at least one of: reachability of the first network element, at least one resource associated with the first network element, service level agreement (SLA) parameters, or load balancing.

12. The one or more non-transitory computer readable storage media of claim 11, wherein the information is obtained from the telemetry data in the IOAM header of the data packet received by the first network element.

13. The one or more non-transitory computer readable storage media of claim 11, wherein the SLA parameters include at least one of packet loss information and packet delay information.

14. The one or more non-transitory computer readable storage media of claim 10, wherein the IOAM header further includes an indicator associated with the BFD field to designate that the data packet includes BFD data to be processed by the first network element.

15. The one or more non-transitory computer readable storage media of claim 10, wherein the telemetry data in the IOAM header is obtained from a plurality of network elements disposed between the first network element and the second network element.

16. An apparatus comprising:
a plurality of network ports configured to receive inbound packets and to send outbound packets;
a memory; and
a processor coupled to the memory and to the plurality of network ports, wherein the processor is configured to:
assign a plurality of your discriminator identifiers associated with a plurality of your discriminators, wherein each your discriminator of the plurality of your discriminators is mapped to a specified action for a first network element;
receive a data packet sent from a second network element, the data packet including one or more headers, wherein the one or more headers include an in-situ operation, administration, and maintenance (IOAM) header comprising telemetry data associated with the data packet and a bidirectional forwarding detection (BFD) field including a specified your discriminator identifier;
determine whether the specified your discriminator identifier in the BFD field of the IOAM header matches one of the plurality of your discriminator identifiers assigned to the plurality of your discriminators; and upon determining that the specified your discriminator identifier matches a first your discriminator identifier of the plurality of your discriminator identifiers, initiate a seamless bidirectional forwarding detection (S-BFD) reflector session to transmit a response packet to the second network element according to a first action mapped to a first your discriminator associated with the first your discriminator identifier.

17. The apparatus of claim 16, wherein the first action comprises providing information to the first network element regarding at least one of: reachability of the first network element, at least one resource associated with the first network element, service level agreement (SLA) parameters, or load balancing.

18. The apparatus of claim 17, wherein the information is obtained from the telemetry data in the IOAM header of the data packet.

19. The apparatus of claim 16, wherein the IOAM header further includes an indicator associated with the BFD field to designate that the data packet includes BFD data to be processed by the processor.

20. The apparatus of claim 16, wherein the telemetry data in the IOAM header is obtained from a plurality of network elements disposed between the first network element and the second network element.

* * * * *